(12) United States Patent
Kim et al.

(10) Patent No.: US 10,173,896 B2
(45) Date of Patent: Jan. 8, 2019

(54) OLIVINE COMPOSITION WITH IMPROVED CELL PERFORMANCE

(71) Applicants: Umicore, Brussels (BE); Umicore Korea Ltd., Chungnam (KR)

(72) Inventors: DaeHyun Kim, Cheonan (KR); Jens Paulsen, Daejeon (KR); Jing Zhang, Chungcheongnam-do (KR)

(73) Assignees: UMICORE, Brussels (BE); UMICORE KOREA LTD., Chungnam (KR)

( * ) Notice: Subject to any disclaimer, the term of this patent is extended or adjusted under 35 U.S.C. 154(b) by 0 days.

(21) Appl. No.: 15/503,123

(22) PCT Filed: Aug. 13, 2014

(86) PCT No.: PCT/IB2014/063890
§ 371 (c)(1),
(2) Date: Feb. 10, 2017

(87) PCT Pub. No.: WO2016/024146
PCT Pub. Date: Feb. 18, 2016

(65) Prior Publication Data
US 2017/0225952 A1    Aug. 10, 2017

(51) Int. Cl.
*H01M 4/50* (2010.01)
*C01B 25/45* (2006.01)
*H01M 4/58* (2010.01)

(52) U.S. Cl.
CPC ........ *C01B 25/45* (2013.01); *H01M 4/5825* (2013.01)

(58) Field of Classification Search
CPC ....... H01M 4/136; H01M 4/366; H01M 4/483
USPC .......................................... 429/94, 220, 224
See application file for complete search history.

(56) References Cited

U.S. PATENT DOCUMENTS

| 5,910,382 | A | 6/1999 | Goodenough et al. |
| 7,285,260 | B2 | 10/2007 | Armand et al. |
| 7,858,233 | B2 | 12/2010 | Song et al. |
| 9,224,512 | B2 * | 12/2015 | Nakabayashi ........ H01M 4/366 |
| 2009/0186277 | A1 | 7/2009 | Beck |

(Continued)

FOREIGN PATENT DOCUMENTS

| JP | 2004063422 | 2/2004 |
| JP | 2009218205 | 9/2009 |

(Continued)

OTHER PUBLICATIONS

International search report for PCT/IB2014/063890, dated Apr. 30, 2015.

(Continued)

*Primary Examiner* — Khanh T Nguyen
(74) *Attorney, Agent, or Firm* — NK Patent Law

(57) ABSTRACT

An olivine cathode material having the formula $Li_aFe_{1-x-y-z}Mn_xD_{(y+z)}(PO_4)_c$, wherein a, c, x, y and z represent molar amounts, wherein D=Mg and/or Cr, wherein y represent the amount of Mg and z represents the amount of Cr, wherein $1.04<a<1.15$; wherein $0.97<(2*c/(a+1))<1.07$; wherein $0.6<x<1-y-z$; wherein $0<y+z<0.1$. These material show improved cathode properties in lithium based rechargeable batteries.

26 Claims, 10 Drawing Sheets

(56) References Cited

U.S. PATENT DOCUMENTS

Figure 1:
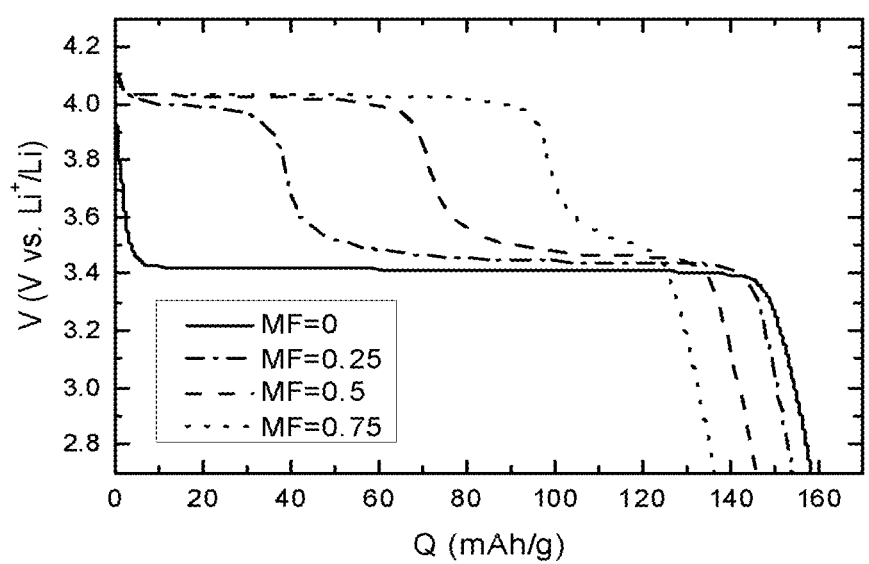

| | | | |
|---|---|---|---|
| 2009/0311585 A1* | 12/2009 | Muraoka | H01M 4/483 |
| | | | 429/94 |
| 2011/0052988 A1 | 3/2011 | Beck | |
| 2013/0029225 A1* | 1/2013 | Matsui | H01M 4/136 |
| | | | 429/220 |
| 2014/0138591 A1 | 5/2014 | Yoon | |

FOREIGN PATENT DOCUMENTS

| | | |
|---|---|---|
| JP | 2011510457 A | 3/2011 |
| JP | 2012229147 | 11/2012 |
| TW | 200950191 | 12/2009 |
| WO | 2014098937 A1 | 6/2014 |

OTHER PUBLICATIONS

Taiwan Search Report for 104126254, dated Apr. 13, 2016.

Yamada, A., et al., "Reaction Mechanism of the Olivine-Type Li$_x$(Mn$_{0.6}$Fe$_{0.4}$)PO$_4$ ($0<x<1$)", Journal, of the Electrochemical Society, vol. 148, No. 7 (2001), pp. A747-A754.

Yamada, A., et al., "Olivine-type Cathodes Achievements and Problems", Journal of Power Sources, vol. 119-121 (2003), pp. 232-238.

* cited by examiner

OLIVINE COMPOSITION WITH IMPROVED CELL PERFORMANCE

CROSS-REFERENCE TO RELATED APPLICATION

This application is a National Stage application of International Application No. PCT/IB2014/063890, filed Aug. 13, 2014.

TECHNICAL FIELD AND BACKGROUND

The invention relates to phosphate based cathode materials for rechargeable batteries with an olivine structure, more in particular non-stoichiometric doped $LiMPO_4$—$M=Fe_{1-x}Mn_x$—based cathode materials.

Most commercial rechargeable Lithium batteries use LCO as cathode material. In this document LCO stands for $LiCoO_2$ based cathode materials. However LCO has major drawbacks such as limited safety, where charged batteries might become unsafe, ultimately going to thermal runaway which can result in a severe explosion, and high cost of the cobalt base metal. Substitution of LCO by the cheaper NMC is ongoing, however also NMC shows severe safety issues. NMC is the abbreviation for $LiMO_2$, $M=Ni_{1-x-y}Mn_xCo_y$ based cathode materials.

LCO and NMC belong to the cathode materials with a layered crystal structure. Another crystal structure of Li battery cathode is the spinel structure. Cathode materials with spinel structure are for example LMO or LNMO. LMO stands for $LiMn_2O_4$ based cathode materials whereas LNMO is the abbreviation for $LiNi_{0.5}Mn_{1.5}O_4$ based cathode materials. These spinets promise improved safety but show other drawbacks. LMO in practice has a too low capacity and LNMO has a very high charge voltage which makes it very difficult to find a sufficiently stable electrolyte which can operate well within the wide voltage window.

Besides the layered crystal structure cathodes (LCO and NMC) and the spinel structure cathodes (LMO and LNMO), phosphate based cathode materials with olivine structure are also of interest, especially due to their inherently much higher safety. Olivine structured phosphate cathode materials were first proposed by Goodenough in 1996.

The Goodenough patent U.S. Pat. No. 5,910,382 discloses examples for LFP as well as LFMP. LFP stands for $LiFePO_4$ and LFMP stands for $LiMPO_4$— with $M=Fe_{1-x}Mn_x$—based cathode materials. An obstacle for the commercialization of olivine crystal structure phosphate cathode materials is the inherently low electronic conductivity. Good electronic contact of the cathode is required because extracting (or re-inserting) of a Li cation requires the simultaneous extraction (or addition) of an electron: $LiMPO_4 \rightarrow MPO_4 + Li^+ + e^-$.

In U.S. Pat. No. 7,285,260, M. Armand and coworkers suggest a method to improve conductivity by carbon coating of olivine. After this disclosure, interest in olivine structure phosphates increased. Commercially most efforts focused on LFP. However—despite of the potentially low cost, high safety and high stability—LFP is still, commercially, a minor cathode material, mostly because LFP has a low energy density. Gravimetric energy density is the product of average voltage and capacity per mass of cathode material. Volumetric energy is the product of average voltage and capacity per volume of cathode material. Despite of a relatively high capacity of about 155-160 mAh/g the energy density (especially the volumetric energy density [Wh/L of cathode]) is insufficient for many applications. This is because of a relatively low crystallographic density (about 3.6 g/cm$^3$) and a relatively low average operation voltage of only 3.3V. For comparison, $LiCoO_2$ has a similar capacity but the average voltage is 4.0V (instead of 3.3V) and the density is 5.05 g/cm$^3$ (compared with 3.6 g/cm$^3$ for LFP).

Already the Goodenough patent teaches that in LFP the transition metal, iron, can be replaced by other transition metals such as manganese. If some Mn replaces Fe then LFMP is obtained, whereas if all Fe is replaced by Mn LMP is formed. LMP stands for $LiMnPO_4$. LMP is of fundamental interest because it has a higher theoretical energy density.

Compared to LFP, LMP has about the same theoretical capacity but a higher average voltage (4.1V versus 3.3V) which promises a significant (24%) increase of the energy density; this effect is however partially offset (−6%) by a lower crystallographic density of LMP (3.4 g/cm$^3$ versus 3.6 g/cm$^3$ for LFP). Up to now, attempts to prepare truly competitive $LiMnPO_4$ failed. The reason for this poor performance is possibly the very low inherent conductivity of $LiMnPO_4$ which, even after carbon coating, prevents achieving a sufficient performance.

Basic properties and issues of LFP, LFMP and LMP are well described for example in "Olivine-type cathodes: Achievements and problems", *Journal of Power Sources* 119-121 (2003) 232-238, by Yamada et al.

US 2009/0186277 A1 discloses improved $LiFePO_4$ based cathodes by deviating from the Li:M:PO$_4$=1:1:1 stoichiometric ratio. The patent discloses a Li:M (lithium:transition metal ratio) between 1-1.3 and a PO$_4$:M (phosphate to transition metal ratio) range of 1.0-1.14, and the transition metal is selected from Cr, Mn, Fe, Co or Ni. In one embodiment M is chosen as Fe, additionally doped by up to 5% of V, Nb, Ti, Al, Mn, Co, Ni, Mg, and Zr. The examples exclusively refer to M=Fe excluding doping by manganese or other elements. The examples demonstrate an advantage of the Li:M and PO$_4$:Fe ratio being non-stoichiometric. A stoichiometric ratio refers to Li:M:PO$_4$=1.00:1.00:1.00, corresponding to the ideal olivine formula $LiFePO_4$. The examples demonstrate that better LFMP performance can be achieved when choosing a Li:M and PO$_4$:M ratio exceeding 1.0.

In "Reaction Mechanism of the Olivine-Type $Li_xMn_{0.6}Fe_{0.4}PO_4$, (0<x<1)", *Journal of The Electrochemical Society*, 148 (7) A747-A754 (2001), Yamada et al. describe the electrochemical properties of LFMP. When Li is extracted, first a partially delithiated phase is created, the lattice constants change in a single phase manner until all Fe has changed valence state from 2- to 3-valent. After all Fe has reached the 3-valent state further delithiation creates a new phase—fully delithiated LFMP—which coexists with the partially delithiated phase, until all Mn has changed from 2- to 3-valent. The paper gives lattice constants for LFP, LFMP and LMP (see Table 1). In Table 1 the volume is the volume of the full unit-cell, containing 4 formula units of $LiMPO_4$. In the current invention the volume refers to the volume of a single formula unit. Using the data of Table 1 allows calculating an approximate lattice constant for LFMP using Vegard's law (linear change of lattice constants) for stoichiometric LFMP.

TABLE 1

Lattice constants of LFP, LFMP and LMP

| Phase | a (Å) | b (Å) | c (Å) | vol (Å³) |
|---|---|---|---|---|
| LFP | a1 = 6.008(1) | b1 = 10.324(2) | c1 = 4.694(1) | v1 = 291.1(6) |
| LMP | a2 = 6.108(1) | b2 = 10.455(2) | c2 = 4.750(2) | v2 = 303.3(5) |
| LFMP, M = $Fe_{1-x}Mn_x$ | a1(1 − x) + a2(x) | b1(1 − x) + b2(x) | c1(1 − x) + c2(x) | v1(1 − x) + v2(x) |

US 2011/0052988 A1 discloses an improved LFMP cathode material. This patent application discloses improved performance by additionally doping of M (M=$Fe_{1-x}Mn_x$) by up to 10% of Co, Ni, V or Nb. In M the manganese content is 35-60 mol %.

The composition of the LFMP according this patent application is not the exact ideal stoichiometric composition (Li:M:$PO_4$=1.00:1.00:1.00) but very near to the stoichiometric composition. The patent discloses a narrow range for Li:M=1.00-1.05, and a narrow $PO_4$:M=1.00-1.020 very near to the stoichiometric value.

U.S. Pat. No. 7,858,233 discloses improved performance of LFP, also by deviating from the stoichiometric Li:M:$PO_4$=1.00:1.00:1.00 ratio. Optimum performance is obtained for Fe rich cathodes, where Li:M<1.0 and $PO_4$:M<1.0.

It is an object of the present invention to provide a solution for the problems related to (bulk) electrochemical performance, energy density, nano-morphology, surface area and electrode density, in particular to obtain materials with a better combination of properties.

SUMMARY

Viewed from a first aspect, the invention provides an olivine cathode material having the formula $Li_aFe_{1-x-y-z}Mn_xD_{(y+z)}(PO_4)_c$, wherein a, c, x, y and z represent molar amounts, wherein D=Mg and/or Cr, wherein y represent the amount of Mg and z represents the amount of Cr, wherein 1.04<a<1.15; wherein 0.97<(2*c/(a+1))<1.07; wherein 0.6<x<1−y−z; wherein 0<y+z<0.1.

Preferably the olivine cathode material according to the invention has the following characteristics, either alone or in combination:

0.04<y+z<0.08, preferably 0.05<y+z<0.08
the molar ratio z/y>1, preferably >2, more preferably y=0
0.7<x<0.9, preferably 0.75<x<0.895
1.07<a<1.13
0.98<(2*c/(a+1))<1.
at least 90% by weight, preferably 98% by weight of the material is a single phase olivine.
the BET surface area value >10 m²/g.

In the invention, the correct choice of composition is important. Within the Li-M-$PO_4$ phase diagram, only a narrow range of compositions gives a good performance.

Besides composition also the choice of dopants is very important. In several embodiments, Cr doping improves the performance significantly.

In particular it was noticed that in traditional compositions an increase in Mn/Fe ratio gives an increase in the energy density of the cathode material, but only up to a certain point, after which it decreases again, due to the fact that the capacity decreases faster than the voltage increases.

In compositions according to the invention, due to the presence of Cr and/or Mg, a much higher level of Mn could be reached without a drop in the energy density, in other words allowing the benefits of replacing Fe by Mn to be extended to higher levels of Mn than previously possible.

BRIEF DESCRIPTION OF THE DRAWINGS (numbering corresponds to the numbering of the Examples)

FIG. 1: voltage profile of non-stoichiometric LFMP with different Mn/(Mn+Fe) ratio.

Figure 2:
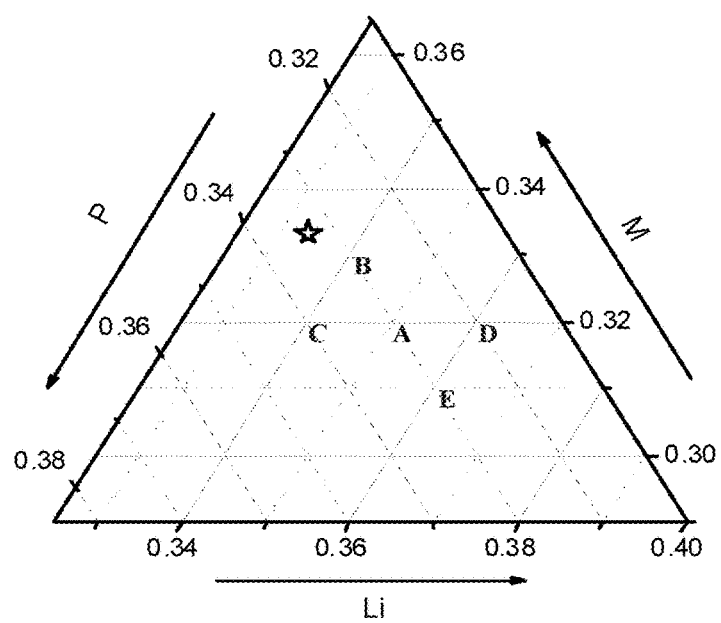
Figure 3:
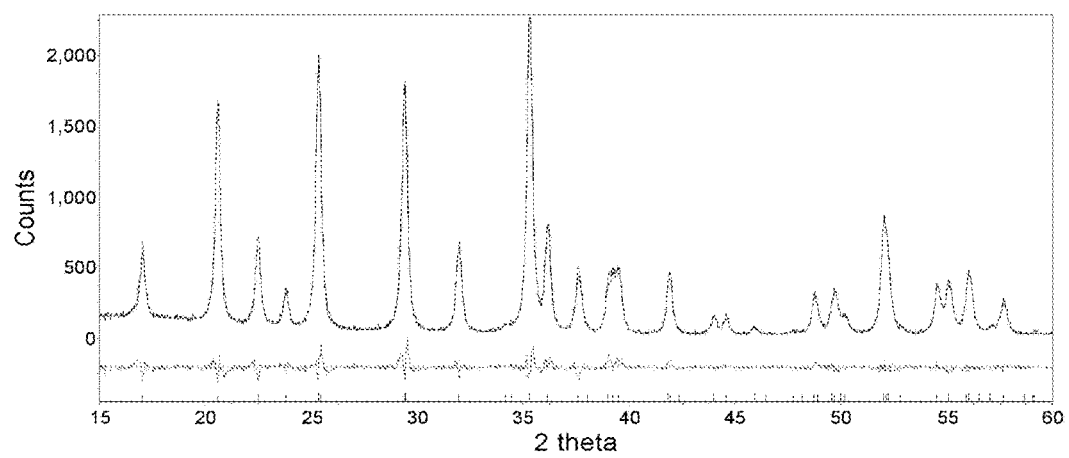

FIG. 2: phase diagram indicating some compositions of non-stoichiometric LFMP according to the invention FIG. 3: XRD diffraction pattern and Rietveld refinement of nonstoichiometric LFMP with optimum Li:M ratio and phosphor composition (composition A) and 7.5 mol % Cr doped FIG. 4: XRD diffraction pattern and Rietveld refinement of nonstoichiometric LFMP with less optimum Li:M ratio and phosphor composition (composition B) and 7.5 mol % Cr doped.

Figure 5:
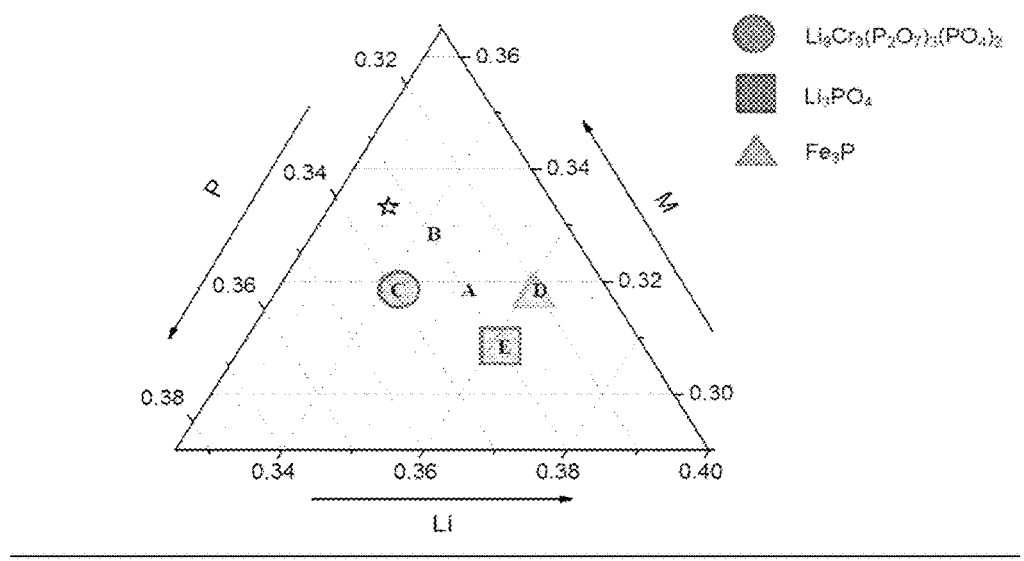

FIG. 5: phase diagram indicating some compositions of non-stoichiometric LFMP according to the invention and the impurity distribution in the phase diagram.

Figure 6:
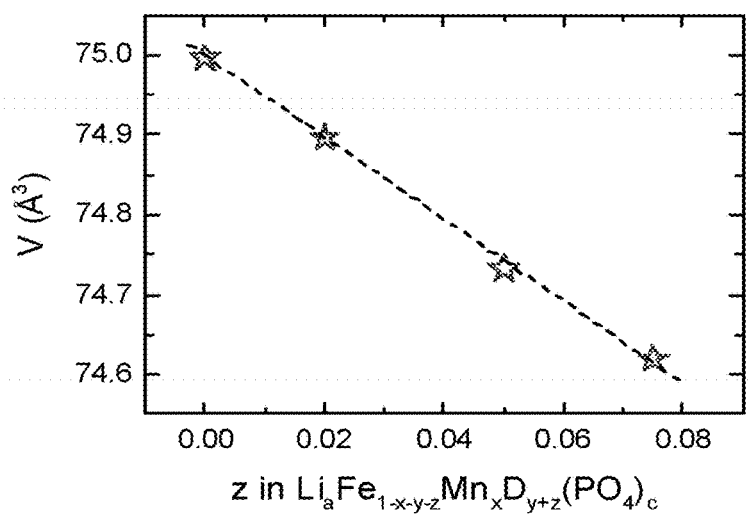

FIG. 6: Volume changes linear as a function of Cr doping in samples with optimized P (0.982) and LM (1.106) stoichiometry.

Figure 7:
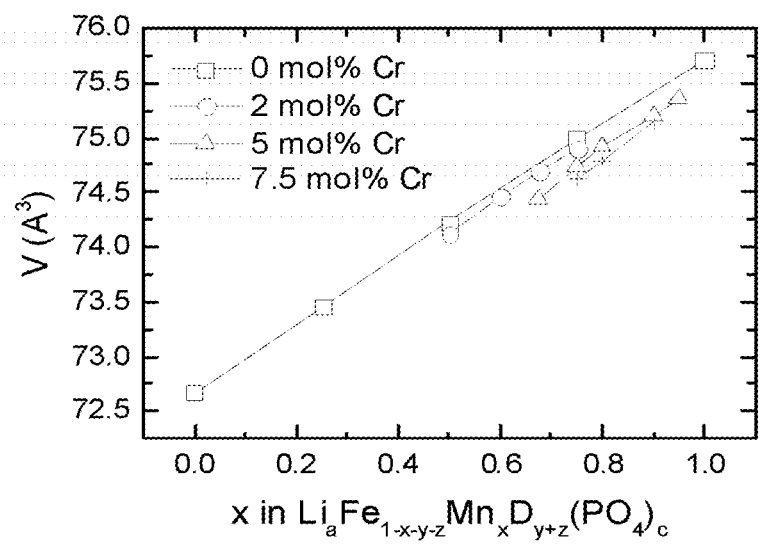

FIG. 7 is a line chart showing unit cell volume versus manganese stochiometry for exemplary LFMP formulas as described in Example 7.

Figure 8:
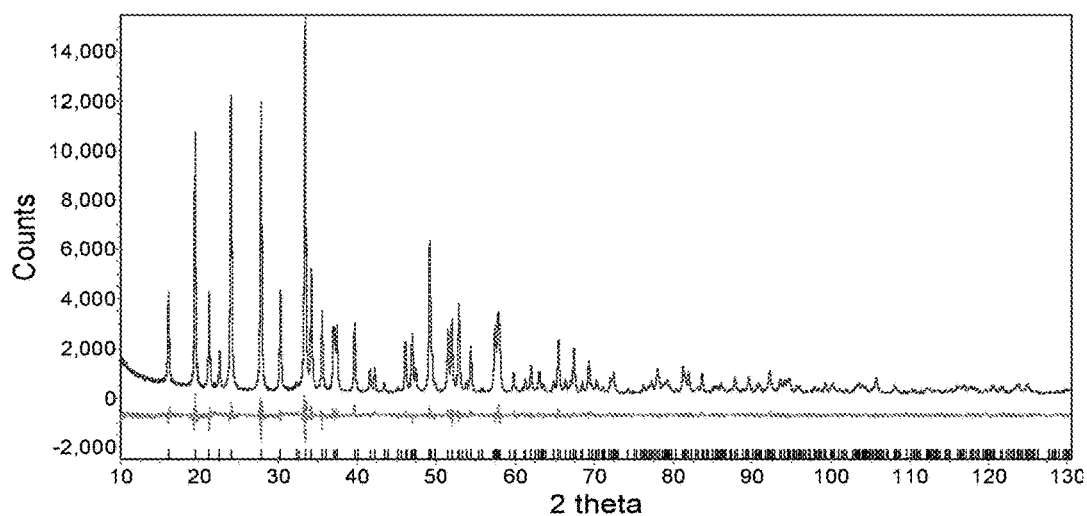

FIG. 8: High resolution XRD diffraction pattern and Rietveld refinement of nonstoichiometric LFMP with optimum composition, Mn/(Mn+Fe) ratio as 0.9 and 5 mol % Cr doped.

Figure 9:
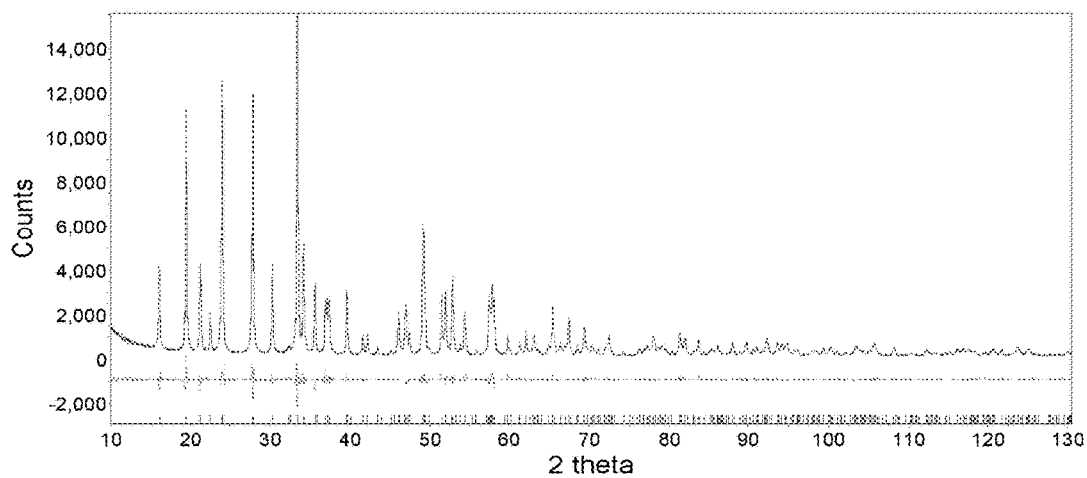

FIG. 9: High resolution XRD diffraction pattern and Rietveld refinement of nonstoichiometric LFMP with optimum composition, Mn/(Mn+Fe) ratio as 0.9 and 7.5 mol % Cr doped.

Figure 10:
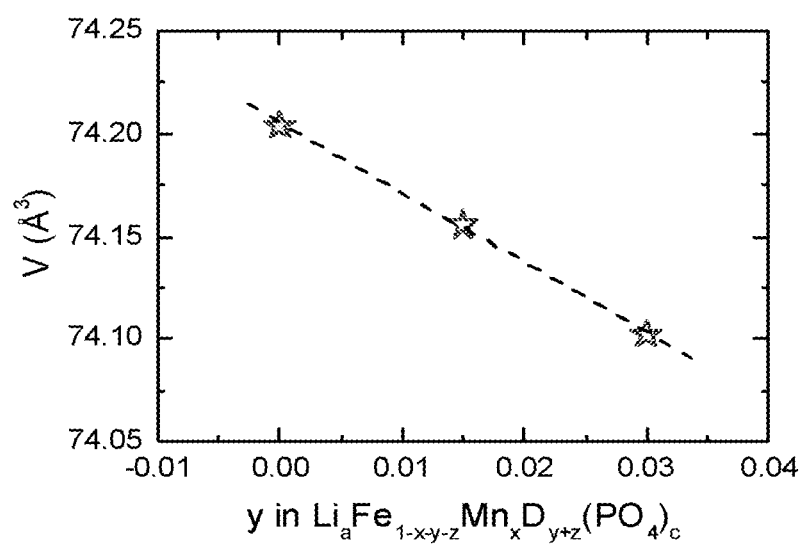

FIG. 10: Volume changes linear as a function of Mg doping in samples with optimized P (0.982) and LM (1.106) stoichiometry.

Figure 11:
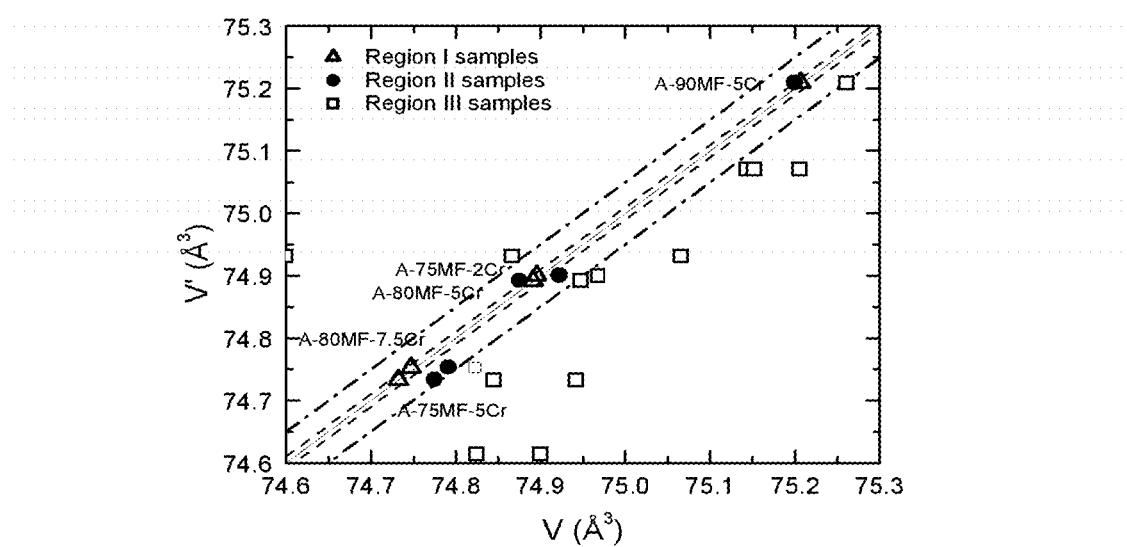

FIG. 11: Volume (calculated by Formula 2) plotted versus measured volume obtained from Rietveld refinement for a large series of samples with different compositions.

DETAILED DESCRIPTION

Experimental Details: Preparation of Lithium Iron Phosphate (LFMP)

The LFMP of the present invention is prepared by the following major steps:

(a) blending of lithium, iron, manganese, phosphate, dopants and carbon precursors;
(b) synthesizing in a reducing atmosphere; and
(c) milling.

The detailed explanation of each step is as follows:

Step (a): blending of lithium, iron, manganese, phosphate, dopants and carbon precursors in the desired amounts for example using a ball mill process. The precursors are put in a vial with zirconia balls and acetone. In one embodiment, lithium carbonate, iron oxalate dihydrate, manganese oxalate, and ammonium phosphate are used as the lithium, iron, manganese, and phosphate precursor. In another embodiment, magnesium hydroxide and chromium acetate hydroxide are used as precursors of magnesium and chromium. Polyethylene-block-polyethylene glycol (PE-PEG) may be used as a carbon precursor for improving electric conductivity. The precursors are milled and blended in the vial by a ball mill process. The wet-type blend is separated from acetone by funnel and dried at 120° C. in an oven to remove acetone. Finally, the dried blend is milled by a grinding machine.

Step (b): sintering in a reducing atmosphere. The LFMP sample is synthesized by using the blend from step (a) in a tube furnace in a reducing atmosphere. In one embodiment the sintering temperature is 650° C. and the dwell time is 2 hours. A mixture of nitrogen ($N_2$, 99%) and hydrogen ($H_2$, 1%) gas is used as a reducing gas.

Step (c): milling. After sintering, finally, the sample is milled by a grinding machine.

Preparation of a Lithium Ion Secondary Cell

A cell in the present invention is prepared by the following major steps:
(a) preparation of a positive electrode, and
(b) cell assembly.

The detailed explanation of each step is as follows:

Step (a): preparation of a positive electrode. A slurry that contains the electrochemical active material LFMP, the conductor, binder and a solvent is prepared by a ball milling process. The formulation comprising the electrochemical active material, conductor, and binder is for example 83.3:8.3:8.3. In one embodiment, conductive carbon black (Super P, produced by Timcal) and PVDF polymer (KF #9305, by Kureha), 1-Methyl-2-Pyrrolidone (NMP, by Sigma-Aldrich) are used as a conductor, a solution of a binder, and a solvent, respectively. These materials are ball milled in a vial for 90 minutes. The milled slurry is spread on a side of an aluminum foil by using a doctor blade coater. It is dried in an oven at 120° C., pressed by using a calendaring tool, and dried again in a vacuum oven to remove the solvent.

Step (b): cell assembling. In the present invention, a half cell (coin cell) is used to test electrochemical properties. The half cell is assembled in a glove box which is filled with an inert gas (argon). A separator (from SK Innovation) is located between the positive electrode and a piece of lithium metal as a negative electrode. 1M $LiPF_6$ in EC/DMC (1:2) is used as an electrolyte, dropped between separator and electrodes.

Cell Testing Procedure

All the cell tests in the present invention follow the same procedure shown in Table 2. A C-rate can be defined as an inverse number of an hour to charge or discharge 140 mAh/g. For example, 5C means that the cell will be charged or discharged in ⅕ hour. "E-Curr" and "V" stands for the end current and cut-off voltage, respectively. At the first cycle, the DQ1 (discharge capacity of the first cycle) and IRRQ (irreversible capacity) are determined. The rate performance is calculated from the second to the sixth cycle. The seventh cycle is repeated fifty times to obtain information on the cycle stability.

TABLE 2 coin cell testing procedure

| Cycle # | times | Charge | | | Discharge | | |
| --- | --- | --- | --- | --- | --- | --- | --- |
| | | C-rate | E-Curr | V | C-rate | E-Curr | V |
| 1 | 1 | 0.1 | 0.05 C | 4.4 | 0.1 | — | 2.7 |
| 2 | 1 | 0.2 | 0.05 C | 4.4 | 1 | — | 2.7 |
| 3 | 1 | 0.2 | 0.05 C | 4.4 | 5 | — | 2.7 |
| 4 | 1 | 0.2 | 0.05 C | 4.4 | 10 | — | 2.7 |
| 5 | 1 | 0.2 | 0.05 C | 4.4 | 15 | — | 2.7 |
| 6 | 1 | 0.2 | 0.05 C | 4.4 | 20 | — | 2.7 |
| 7 | 50 | 0.5 | 0.05 C | 4.4 | 1 | — | 2.7 |

The cathode materials are non-stoichiometric, thus either the lithium/metal ratio and/or the phosphor stoichiometry $PO_4$/(lithium+metal) deviate from unity. It is noted that here, and later, 'metal', or M is used to designate the total of Fe, Mn, Cr and Mg.

Several olivine cathode materials having the formula $Li_aFe_{1-x-y}Mn_xD_{y+z}(PO_4)_c$, were prepared, wherein D=Mg and/or Cr, Surprisingly, the performance of LFMP depends very sensitively on the phosphor stoichiometry and the optimum performance is not achieved at the stoichiometric value 1:1. A good performance is defined by a high reversible capacity, high rate performance and good cycling stability. Small deviations of the optimum phosphor stoichiometry result in significant deviations of the electrochemical performance. Previous art usually considered the lithium to metal ratio and phosphor to metal ratio to be of importance. In the current application we detected that the use of phosphor stoichiometry, being the amount of $PO_4$ compared to half the sum of lithium and metal is a more appropriate variable, since the variation in electrochemical performance can be predicted more accurately by using the latter ratio further to be called "P".

In several embodiments, the cathodes have an optimum lithium to metal ratio phosphor to (lithium+metal)/2 ratio of about 0.980, and, surprisingly, the optimum lithium to metal ratio LM and the optimum phosphor stoichiometry P do not depend on the choice of dopants and the MF ratio.

In the case of high Mn to Fe ratio, where MF>0.75,Cr doping significantly improves the rate performance and therefore allows to obtain high discharge capacity and energy density. The authors believe that this improvement is caused by better solid state diffusion in the bulk. The improvement does not originate from larger surface as demonstrated in example 8.

EXAMPLE 1

Voltage Profile with Varying MF Ratio (Mn:(Mn+Fe))

FIG. 1 shows the voltage profile of four non-stoichiometric LFMP samples, where the only variable is the manganese to iron ratio (MF ratio). In the FIG. 1, "V" stands for the average voltage and "Q" stands for the discharge capacity. For each curve, they refer to LFMP sample with a different MF ratio, which changes from 0 to 0.75. When MF>0, the voltage profiles show two plateaus, where the higher one corresponds to the $Mn^{3+}/Mn^{2+}$ and lower one is for $Fe^{3+}/Fe^{2+}$. As MF raises, the higher plateau extends and lower one shrinks. As a result, the average voltage increases with increased MF. A higher voltage is in general interesting for the applications in which a battery is to be used.

On the contrary, the discharge capacity becomes smaller when the MF changes more. Therefore, the change of energy density for MF increasing depends on the competence between the voltage ascending and the discharge capacity descending. There could be a maximum point for energy density as a function of MF ratio. It would be quite interesting to find this maximum point and push it to high MF direction in order to get higher energy density.

Also, a higher level of Mn would allow to diminish the two-plateau voltage observed. This is beneficial as such a two-plateau voltage is detrimental for further practical application.

However, with undoped cathode product, an increase in Mn can only be obtained at the expense of a lower energy density.

EXAMPLE 2

Non-stoichiometric LFMP

FIG. 2 shows the phase diagram indicating certain compositions of non-stoichiometric LFMP, indicated by A to E, the 1:1:1 stoichiometric ratio indicated by a star "☆" symbol. For the compositions in this Example, the amount of Mn equals the amount of Fe, MF=0.5:0.5. The sample ID (identity) in the present invention is composed of two parts; the composition and doping state. The Latin alphabet, shown in FIG. 1, stand for the target composition of each non-stoichiometric LFMP sample. The result of an ICP (inductively coupled plasma) analysis shows good agreement with the target composition. The non-stoichiometric LFMP and the coin cells are prepared and analyzed by the procedure described before.

Five non-stoichiometric LFMP samples are prepared without doping. The electrochemical properties of the each sample are shown in Table 1. "-50MF" and "-ND" in a sample ID stands for Mn/(Mn+Fe) ratio as 50 and a sample without doping by Mg and/or Cr, respectively. DQ1, IRRQ, 5C, and Fading means the discharge capacity of the first cycle, the ratio of irreversible capacity, the discharge capacity at 5C, and the ratio of the faded discharge capacity after 100 cycles, respectively. Most physical and electrochemical properties shift sensitively as a function of the ratio of $PO_4$ content to (Li+M) content. Three samples of which $PO_4$:[(Li+M)/2] values are close to 0.982 have higher discharge capacity, lower irreversible capacity, better rate performance, and acceptable cycle stability. Among them, A-50MF-ND has better electrochemical performance than the other two samples. Star-50MF-ND present the non-doped stoichiometric sample. Its discharge capacity is clearly smaller than the three samples with the value of $PO_4$:[(Li+M)/2] as 0.982. Therefore, based on the comparison of discharge capacity, the non-stoichiometric sample A is demonstrated as optimum composition for the further investigation, which is slightly better than sample B and much more improved than stoichiometric sample.

TABLE 1

Electrochemical properties of non-stoichiometric LFMP samples as a function of composition

| Sample ID | Composition | | | DQ1 (mAh/g) | IRRQ (%) | 5 C (mAh/g) | Fading (%/100) |
|---|---|---|---|---|---|---|---|
| | $PO_4$/M | Li/M | $PO_4$/[(Li + M)/2] | | | | |
| A-50MF-ND | 1.034 | 1.106 | 0.982 | 144.0 | 2.8 | 125.8 | −0.9 |
| B-50MF -ND | 1.003 | 1.042 | 0.982 | 140.0 | 3.9 | 122.0 | −0.7 |
| C-50MF -ND | 1.066 | 1.074 | 1.028 | 140.0 | 6.4 | 113.5 | 1.8 |
| D-50MF -ND | 1.003 | 1.137 | 0.939 | 138.8 | 10.7 | 123.1 | −2.1 |
| E-50MF -ND | 1.068 | 1.174 | 0.982 | 141.4 | 3.1 | 122.9 | −3.4 |
| Star-50MF -ND | 1.000 | 1.000 | 1.000 | 138.3 | 2.9 | 121.4 | −5.7 |

EXAMPLE 3

Cr-doped Non-stoichiometric LFMP

Five Cr-doped non-stoichiometric LFMP samples are prepared and analyzed by the procedure described before. The ratio of molar amount between Mn and Fe is 75 to 25. The electrochemical properties of the each sample are shown in Table 2. The Latin alphabet and "-75MF-2Cr" in a sample ID stand for the target composition of each LFMP samples as shown in FIG. 2, each sample containing 2mol % Cr and Mn:(Mn+Fe) ratio as 75, respectively. Most physical and electrochemical properties shift sensitively as a function of the ratio of $PO_4$ content to (Li+M) content. Three samples of which $PO_4$/[(Li+M)/2] values are close to 0.98 have higher discharge capacity, lower irreversible capacity, better rate performance, and acceptable cycle stability. Among them, A-75MF-2Cr has the best performance. This is in agreement with the case of non-doped LFMP samples. Therefore, even doping with 2 mol % Cr, the optimum composition for non-stoichiometric LFMP still locates at A, which is slightly better than sample B.

TABLE 2

Electrochemical properties of non-stoichiometric LFMP samples doping with 2 mol % Cr as a function of composition

| Sample ID | Composition | | | DQ1 (mAh/g) | IRRQ (%) | 5 C (mAh/g) | Fading (%/100) |
|---|---|---|---|---|---|---|---|
| | $PO_4/M$ | Li/M | $PO_4/[(Li + M)/2]$ | | | | |
| A-75MF-2Cr | 1.034 | 1.106 | 0.982 | 145.3 | 3.37 | 133.9 | −4.35 |
| B-75MF-2Cr | 1.003 | 1.042 | 0.982 | 144.5 | 4.11 | 133.6 | −3.63 |
| C-75MF-2Cr | 1.066 | 1.074 | 1.028 | 113.9 | 6.43 | 86.9 | −16.25 |
| D-75MF-2Cr | 1.003 | 1.137 | 0.939 | 138.4 | 4.84 | 128.6 | −3.38 |
| E-75MF-2Cr | 1.068 | 1.174 | 0.982 | 139.0 | 3.61 | 127.5 | −2.69 |

EXAMPLE 4

Fixed $PO_4$ and Li/M Stoichiometry and Varying Mn/(Mn+Fe) Ratio

Five undoped non-stoichiometric LFMP samples which have the P and L/M stoichiometry of sample "A-" but with varying Mn:(Mn+Fe) ratio are prepared and analyzed by the procedure described before. The physical and electrochemical properties of the samples are shown in Table 3. "A-" in a sample ID stands for the specific composition of which $PO_4/[(Li+M)/2]$ is 0.982 and Li/M is 1.106, and "0MF, 25MF, 50MF, 75MF, 100MF" stands for the Mn:(Mn+Fe) ratio in mol %. DQ1, IRRQ, 5C, $V_{avg}$ and Energy density mean the discharge capacity of the first cycle, the ratio of irreversible capacity (1-discharge capacity/charge capacity), the discharge capacity at 5C, the average voltage during the first cycle and the energy density calculated from the discharge capacity and average voltage of the first cycle, respectively. The column "volume" gives the unit cell volume per olivine formula unit $LiMPO_4$.

In terms of energy density, an excellent result at MF=0.25 is achieved for the non-stoichiometric composition with P=0.982 and LM=1.106. A-25MF-ND has the highest energy density value among these samples and higher average voltage than A-0MF-ND (LFP). As MF ratio increases from 0.25 to 0.75, the discharge capacity decreases linearly while the average voltage increases linearly and the energy density decreases because the decreasing ratio of the discharge capacity is higher than increasing ratio of the average voltage. At MF=1.00, a relatively poor performance is obtained. It can be stated that the performance of undoped LFMP starts deteriorating at about MF=0.75.

Therefore, it is impossible to achieve good electrochemical performance for undoped LFMP samples containing high amount of Mn. It can further be deduced that a modification of Mn-rich LFMP is required to improve the performance, such as ion doping.

TABLE 3

Physical and electrochemical properties of non-doped LFMP samples as a function of Mn/(Mn + Fe) ratio

| Sample ID | Mn/(Mn + Fe) ratio | Volume ($A^3$) | DQ1 (mAh/g) | IRRQ (%) | 5 C (mAh/g) | $V_{avg}$ (V) | Energy density (mWh/g) |
|---|---|---|---|---|---|---|---|
| A-0MF-ND | 0% | 72.6747 | 158.5 | −0.8 | 148.3 | 3.40 | 538.8 |
| A-25MF-ND | 25% | 73.4495 | 153.6 | 0.1 | 143.7 | 3.57 | 548.2 |
| A-50MF-ND | 50% | 74.2107 | 144.0 | 2.8 | 125.8 | 3.71 | 533.9 |
| A-75MF-ND | 75% | 74.9960 | 136.2 | 3.3 | 121.7 | 3.86 | 525.9 |
| A-100MF-ND | 100% | 75.7086 | 111.0 | 9.0 | 69.9 | 3.87 | 428.9 |

EXAMPLE 5

Moderately Cr-doped Non-stoichiometric LFMP with High Amount of Mn

Five Cr-doped non-stoichiometric LFMP samples are prepared and analyzed by the procedure described before. The ratio of molar amount between Mn and Fe is 80 to 20. The electrochemical properties of the each sample are shown in Table 4. The Latin alphabet and "-80MF-7.5Cr" in a sample ID stand for the target composition of each LFMP samples as shown in FIG. 2, each sample containing 7.5 mol % Cr and the Mn/(Mn+Fe) ratio is 0.8, respectively. Most physical and electrochemical properties shift sensitively as a function of the ratio of $PO_4$ content to (Li+M) content. Three samples of which $PO_4/[(Li+M)/2]$ values are close to 0.98 have higher discharge capacity and better rate performance. Among them, A-80MF-7.5Cr has the best performance. This is in agreement with the case in Example 2 and 3. Therefore, it further confirms that sample "A-" is the optimum composition for non-stoichiometric LFMP, even at high Cr doping condition.

TABLE 4

Electrochemical properties of non-stoichiometric LFMP samples doping with 7.5 mol % Cr as a function of composition

| Sample ID | Composition | | | DQ1 (mAh/g) | IRRQ (%) | 5 C (mAh/g) | Fading (%/100) |
| --- | --- | --- | --- | --- | --- | --- | --- |
| | $PO_4/M$ | Li/M | $PO_4/[(Li + M)/2]$ | | | | |
| A-80MF-7.5Cr | 1.034 | 1.106 | 0.982 | 143.9 | 3.31 | 136.0 | 1.63 |
| B-80MF-7.5Cr | 1.003 | 1.042 | 0.982 | 141.5 | 3.34 | 128.7 | 3.26 |
| C-80MF-7.5Cr | 1.066 | 1.074 | 1.028 | 122.3 | 3.88 | 94.8 | 5.94 |
| D-80MF-7.5Cr | 1.003 | 1.137 | 0.939 | 131.4 | 4.19 | 118.1 | 1.79 |
| E-80MF-7.5Cr | 1.068 | 1.174 | 0.982 | 139.8 | 4.06 | 132.8 | 3.27 |

Figure 4:
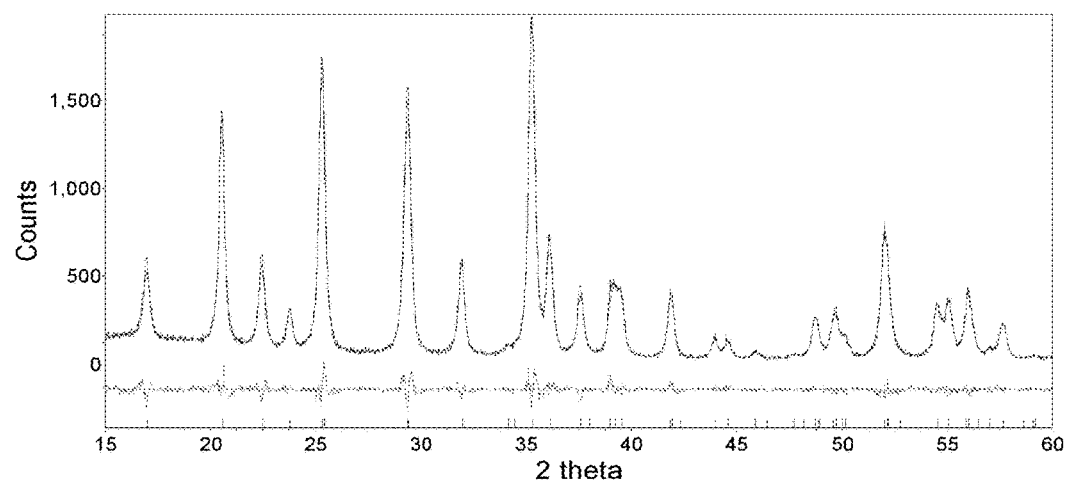

FIGS. 3 and 4 provide the XRD powder diffraction and Rietveld refinement for selected samples "A-80MF-7.5Cr" and "B-80MF-7.5Cr", respectively. The measured pattern, calculated pattern and the difference between both patterns are present in these figures. No major impurities can be resolved. Contrary to sample "A-" and "B-", the other three samples "C-", "D-" and "E-" contain a little of impurities. FIG. 5 gives the impurity trace of samples list in Table 4. Each colored circle represents one kind of impurity phase, as shown in the legend bar. For instance, the sample "C-80MF-7.5Cr" is circled with blue line, meaning this sample contains the impurity phase of $Li_9Cr_3(P_2O_7)_3(PO_4)_2$. Therefore, among the five non-stoichiometric compositions, only "A-" and "B-" possess single phase. Meanwhile, they also show better electrochemical performance than other compositions

EXAMPLE 6

Relation Between Cr Doping Level and Unit Cell Volume by XRD

This Example shows four Cr-doped samples with optimum non-stoichiometric composition "A-" and fixed MF (Mn/(Mn+Fe)) as 0.75. Each sample has different Cr doping level. Table 5 lists the samples and their XRD results for the lattice parameters a, b and c obtained from Rietveld refinement. The column "Vol" gives the unit cell volume per olivine formula unit $LiMPO_4$. It is clearly to see that the volume descends as the amount of Cr increases. Thus, it confirms that Cr does dope into the LFMP structure when the doping level goes up to 7.5 mol %. The inventors observed that the change of volume for doping (Cr) follows in a good approximation Vegard's law, displaying linear relations. FIG. 6 gives example for this linear relation, where "V" stands for unit cell volume per LFMP formula and the star symbols stand for the measured values and the dotted line refers to a linear fit. The fitting result is expressed as the following equation: Volume=−5.0747*Cr+74.9948.

TABLE 5

XRD diffraction results for samples with preferred non-stoichiometric $PO_4$ and Li:M stoichiometry

| Sample | a (Å) | b (Å) | c (Å) | Vol (Å$^3$) |
| --- | --- | --- | --- | --- |
| A-75MF-ND | 10.4198 | 6.0820 | 4.7336 | 74.9960 |
| A-75MF -2Cr | 10.4127 | 6.0780 | 4.7321 | 74.8724 |
| A-75MF -5Cr | 10.4131 | 6.0772 | 4.7308 | 74.8448 |
| A-75MF -7.5Cr | 10.3933 | 6.0715 | 4.7300 | 74.6193 |

EXAMPLE 7

Relation Between MF Ratio and Unit Cell Volume by XRD

This Example provides the samples with different MF ratio and Cr doping level at the fixed optimum non-stoichiometric composition "A-". They are prepared and analyzed by the procedure described before. The unit cell volume of these samples are obtained through Rietveld refinement of XRD powder pattern. The inventor found that the change of volume for manganese stoichiometry MF (Mn/(Mn+Fe)) follows in a good approximation Vegard's law, displaying linear relations. FIG. 7 gives examples for these linear relations, where "V" stands for unit cell volume per LFMP formula. The square, circle, triangle and cross markers stand for non-doped, 2 mol % Cr doped, 5 mol % Cr doped and 7.5 mol % Cr doped LFMP samples, respectively. The slopes of these fitting lines are quite similar and close to 3.2. These linear relations suggest a solid-solution behavior in Cr-doped non-stoichiometric LFMP samples.

EXAMPLE 8

Excellent Electrochemical Performance of Moderately Cr-doped Non-stoichiometric LFMP with High Amount of Mn Table 6 gives a series of Cr-doped non-stoichiometric LFMP with high amount of Mn at optimum composition "A-". The "75MF", "80MF" and "90MF" in the sample ID refer to MF ratio as 0.75, 0.8 and 0.9; "2Cr", "5Cr" and "7.5Cr" stand for Cr doping level as 0.02, 0.05 and 0.075. The column "BET" refers to the BET surface area. There is no clear trend of the surface area with the change of Cr doping and MF ratio. Most samples value are close to 30 $m^2/g$.

Often performance depends on the BET surface area. In this case, as BET is not changing. the performance improvement is caused by composition.

As to the electrochemical properties, it is observed that the discharge capacity is much enhanced through appropriate amount of Cr doping compared with non-doped LFMP. In Example 4, it was stated that the discharge capacity quickly drops from 136 mAh/g to 111 mAh/g when the MF ratio upraises from 0.75 to 1. In this example, the sample "A-75MF-2Cr" and "A-75MF-5Cr" both possess higher discharge capacity by doped with 2 mol % and 5 mol % Cr. When lifting the MF ratio up to 0.8 or even 0.9, the discharge capacity almost remain the same with the assistance of Cr doping. Moreover, the voltage obviously increases with higher MF ratio as expected, so the energy density is definitely improved at high MF with suitably Cr doping. Among tested samples, the best one is "A-90MF-5Cr", where the energy density achieves 572.5 mWh/g.

Therefore, in this example, it is proved that non-stoichiometric LFMP with high MF ratio could possess excellent electrochemical properties by the method of Cr doping.

TABLE 6

Physical and electrochemical properties for moderately Cr-doped samples with high amount of Mn

| Sample ID | Volume ($Å^3$) | BET ($m^2/g$) | DQ1 (mAh/g) | IRRQ (%) | 5 C (mAh/g) | $V_{avg}$ (V) | Energy density (mWh/g) |
|---|---|---|---|---|---|---|---|
| A-75MF-2Cr | 74.8956 | 29.3 | 145.2 | 3.4 | 92.2 | 3.86 | 560.7 |
| A-75MF-5Cr | 74.7326 | 35.5 | 145.7 | 3.9 | 93.4 | 3.87 | 564.3 |
| A-80MF-5Cr | 74.8913 | 33.0 | 144.1 | 2.9 | 91.4 | 3.92 | 565.7 |
| A-90MF-5Cr | 75.2065 | 28.9 | 144.4 | 3.6 | 89.0 | 3.96 | 572.5 |
| A-80MF-7.5Cr | 74.7472 | 30.2 | 143.9 | 3.3 | 94.5 | 3.92 | 564.9 |

EXAMPLE 9

XRD Data for Moderately Cr-doped Non-stoichiometric LFMP with High Amount of Mn

A further investigation of synchrotron XRD (high resolution) on sample "A-90MF-5Cr" and "A-90MF-7.5Cr" are shown in FIGS. 8 and 9, respectively. The figure includes the measured pattern, calculated pattern and the difference between both patterns. No obvious impurity phase can be resolved in both cases. Thus, it can be confirmed that highly Cr-doped Mn-rich non-stoichiometric LFMP achieve single phase, even in the high resolution XRD analysis.

In the Rietveld refinement of LFMP, Mn and Fe locate in the 4c site of PNMA space group. This site is represented as "M'-site". When Cr is doped into the structure, it is supposed that it occupies "M'-site" with trivalent state and $Li^+$ ion accompanies with it into "M'-site" for charge compensation.

However, in the Rietveld refinement, it is found that $Li^+$ does not increase at "M'-site" when Cr doping level increases. This is contrary to the initial supposition. So it is possible that Cr inserts into "M'-site" with bivalent state, meaning no $Li^+$ required for charge compensation. Cr doping happens as homo-valent doping, rather than hetero-valent doping.

EXAMPLE 10

Highly Cr-doped Non-stoichiometric LFMP with High Amount of Mn

TABLE 7

Physical and electrochemical properties for highly Cr-doped samples with high amount of Mn

| Sample ID | Volume ($Å^3$) | BET ($m^2/g$) | DQ1 (mAh/g) | IRRQ (%) | 5 C (mAh/g) | $V_{avg}$ (V) | Energy density (mWh/g) |
|---|---|---|---|---|---|---|---|
| A-80MF-10Cr | 74.9003 | 30.3 | 134.3 | 2.9 | 89.7 | 3.90 | 524.1 |
| A-90MF-10Cr | 75.0660 | 33.7 | 136.8 | 5.3 | 90.5 | 3.97 | 543.1 |

Two 10 mol % Cr doped non-stoichiometric LFMP samples are prepared and analyzed through the procedure described before. The MF ratio of these samples are 0.8 and 0.9. Table 7 lists their physical and electrochemical properties. The BET surface area of these two samples are close to 30, which is similar to the data in Example 8. Due to the high amount of Mn, the average voltage of "A-80MF-10Cr" and "A-90MF-10Cr" are high as expected. But the discharge capacity is relatively low compared with less Cr-doped samples, such as "A-90MF-5Cr" in Example 8. Thus, based on discharge capacity and voltage data, the energy density of sample "A-80MF-10Cr" and "A-90MF-10Cr" are smaller. The possible reason could be too much Cr doped into the olivine structure so that "active site" decreases. XRD powder diffraction of these two samples show a little Cr-containing impurity existing, which confirms the suggestion of Cr overloading in these two samples.

EXAMPLE 11

Moderately Cr-doped LFMP with High Amount of Mn at Non-stoichiometric Composition B Five samples are prepared with the same MF ratio and Cr doping level as samples in Example 8 and varying the non-stoichiometric composition from "A-" to "B-". Table 8 gives their physical and electrochemical properties. All the BET surface area of samples in this Example are a slightly higher than that of the corresponding samples in Example 8. Since both samples in Example 8 and 11 have the same MF ratio and Cr doping level, and the BET is slightly larger, the improvement of properties of "A" samples is due to the non-stoichiometric composition as show in FIG. 2. Compared with sample "A-" in Example 8, sample "B-" in this Example have slightly smaller discharge capacity and voltage, so that the energy density is also lower. This once again confirms the optimum non-stoichiometric composition remain at "A-", no matter what doping conditions (Cr=0-7.5 mol %). IRRQ and rate performance have no obvious trend of change for composition varying.

TABLE 8

Physical and electrochemical properties for moderately Cr-doped samples with high amount of Mn and non-stoichiometric composition "B-"

| Sample ID | Volume (Å$^3$) | BET (m$^2$/g) | DQ1 (mAh/g) | IRRQ (%) | 5 C (mAh/g) | $V_{avg}$ (V) | Energy density (mWh/g) |
|---|---|---|---|---|---|---|---|
| B-75MF-2Cr | 74.9223 | 32.3 | 144.5 | 4.1 | 92.4 | 3.86 | 557.9 |
| B-75MF-5Cr | 74.7750 | 38.7 | 144.5 | 2.9 | 90.1 | 3.86 | 557.9 |
| B-80MF-5Cr | 74.8751 | 33.5 | 141.6 | 2.3 | 93.0 | 3.90 | 551.9 |
| B-90MF-5Cr | 75.2041 | 32.8 | 139.4 | 5.8 | 88.2 | 3.95 | 549.9 |
| B-80MF-7.5Cr | 74.7919 | 34.9 | 141.5 | 3.3 | 91.0 | 3.90 | 551.5 |

EXAMPLE 12

Relation Between Doping Conditions (Cr Doping Level and MF Ratio) and Unit Cell Volume by XRD This Example shows results of XRD powder diffraction and Rietveld refinement for samples "A-" in Example 8. Table 9 gives their lattice constants and unit cell volume. The last column in Table 9 gives the unit cell volume Vol calculated by the Formula 1 below. It shows that the calculated volumes are quite close to the measured volume.

So the formula 1 could be used to estimate unit cell volume of Cr-doped non-stoichiometric LFMP with high amount of Mn.

In the formula Cr is the doping levels z and MF is the manganese stoichiometry x, defined by M=(Fe$_{1-x}$Mn$_x$)$_{1-y-z}$Mg$_y$Cr$_z$. The availability of this formula is limited in single phase and prefers the non-stoichiometric composition "A-". The coefficient of Cr and Mn variables are quite close to the slopes of fitting lines in Example 6 and 7, where the correlations between unit cell volume and Cr doping state or Mn amount are describes. So it verifies the availability of this formula in Cr-doped non-stoichiometric LFMP samples.

TABLE 9

XRD diffraction results for moderately Cr-doped samples at composition "A-"

| Sample | a (Å) | b (Å) | c (Å) | Vol (Å$^3$) | Vol (calc) |
|---|---|---|---|---|---|
| A-75MF-2Cr | 10.4147 | 6.0791 | 4.7319 | 74.8956 | 74.9008 |
| A-75MF-5Cr | 10.4014 | 6.0737 | 4.7318 | 74.7326 | 74.7339 |
| A-80MF-5Cr | 10.4182 | 6.0779 | 4.7309 | 74.8913 | 74.8925 |
| A-90MF-5Cr | 10.4205 | 6.0928 | 4.7382 | 75.2065 | 75.2097 |
| A-80MF-7.5Cr | 10.3982 | 6.0750 | 4.7332 | 74.7472 | 74.7534 |

EXAMPLE 13

Mg-doped Non-stoichiometric LFMP

Three non-stoichiometric LFMP sample doped with 0 mol %, 1.5 mol % and 3 mol % Mg are prepared and analyzed by the procedure described before. The amount of Mn equals the amount of Fe and the composition is chosen as "A-". Table 10 gives the samples and their physical and electrochemical properties. It is clear to see that the unit cell volume decreases with Mg doping level upraising. FIG. 10 demonstrates this dependence is linear.

TABLE 10

Physical and electrochemical properties for Mg-doped non-stoichiometric LFMP samples with fixed composition "A-"

| Sample ID | Volume (Å3) | BET (m2/g) | DQ1 (mAh/g) | IRRQ (%) | 5 C (mAh/g) | Fading (%/100) |
|---|---|---|---|---|---|---|
| A-50MF-ND | 74.2037 | 29.8 | 140.7 | 2.9 | 123.4 | −5.7 |
| A-50MF-1.5M | 74.1556 | 30.9 | 144.7 | 2.7 | 128.3 | 0.7 |
| A-50MF-3M | 74.1020 | 30.6 | 143.0 | 2.8 | 125.7 | −0.1 |

EXAMPLE 14

Relation Between Doping Conditions (Cr, Mg Doping Level and MF Ratio) and Unit Cell Volume by XRD On the basis of Example 12 and 13, the formula 1 could be extended to include the case of Mg-doping. The extended formula is shown as formula 2 below. In the formula, Mg and Cr are the doping levels y and z, and MF is the manganese stoichiometry x, defined by M=(Fe$_{1-x}$Mn$_x$)$_{1-y-z}$Mg$_y$Cr$_z$. Table 11 shows the lattice constants of samples in Example 13. The last column gives the unit cell volume Vol calculated by the Formula 2. The calculated volume is quite close to the measured data, so formula 2 could be applied to estimate unit cell volume in the case of Mg-doped non-stoichiometric LFMP. It can be further deduced that this formula is available to predict the unit cell volume of Mg and/or Cr doped non-stoichiometric LFMP samples.

$$Vol = 72.633 - 5.562Cr + 3.172Mn \qquad \text{Formula 1}$$

$$Vol = 72.633 - 3.8715Mg - 5.562Cr + 3.172Mn \qquad \text{Formula 2}$$

TABLE 11

XRD diffraction results for Mg-doped non-stoichiometric LFMP samples at composition "A-"

| Sample | a (Å) | b (Å) | c (Å) | Vol (Å$^3$) | Vol (calc) |
|---|---|---|---|---|---|
| A-50MF-ND | 10.3868 | 6.0548 | 4.7196 | 74.2107 | 74.2190 |
| A-50MF-1.5M | 10.3836 | 6.0529 | 4.7195 | 74.1556 | 74.1609 |
| A-50MF-3M | 10.3801 | 6.0508 | 4.7192 | 74.1020 | 74.1029 | well with isoline (solid black line in the figure). A volume region within the range of isoline±0.01 (Å$^3$) is defined as Region I. Since all five samples in this region possess excellent electrochemical performance, it can be deduced that samples with optimized doping conditions and compositions locate in this area. By extending the volume range of Region I to isoline±0.05 (Å$^3$), Region II is defined as less preferred area for electrochemical properties, since samples locating in this region have slightly smaller energy density than those in Region I. By excluding Region I and II, the left area is defined as Region III, where the electrochemical performance of samples are the worst among the analyzed samples in Table 12. Therefore, by applying formula 2 and FIG. 11 to a Cr-doped Mn-rich non-stoichiometric LFMP sample, its electrochemical performance can be evaluated.

TABLE 12

Unit cell volume and energy density for Cr-doped Mn-rich non-stoichiometric LFMP samples

| Sample ID | Region ID | Composition Li/M | PO$_4$/[(Li + M)/2] | Volume (Å$^3$) | Volume (calc) (Å$^3$) | Energy density (mWh/g) |
|---|---|---|---|---|---|---|
| A-75MF-2Cr | I | 1.106 | 0.982 | 74.8956 | 74.90076 | 560.7 |
| A-75MF-5Cr | I | 1.106 | 0.982 | 74.7326 | 74.7339 | 564.3 |
| A-80MF-5Cr | I | 1.106 | 0.982 | 74.8913 | 74.8925 | 565.7 |
| A-90MF-5Cr | I | 1.106 | 0.982 | 75.2065 | 75.2097 | 572.5 |
| A-80MF-7.5Cr | I | 1.106 | 0.982 | 74.7472 | 74.75345 | 564.9 |
| B-75MF-2Cr | II | 1.042 | 0.982 | 74.9223 | 74.90076 | 557.9 |
| B-75MF-5Cr | II | 1.042 | 0.982 | 74.7750 | 74.7339 | 557.9 |
| B-80MF-5Cr | II | 1.042 | 0.982 | 74.8751 | 74.8925 | 551.9 |
| B-90MF-5Cr | II | 1.042 | 0.982 | 75.2041 | 74.75345 | 549.9 |
| B-80MF-7.5Cr | II | 1.042 | 0.982 | 74.7919 | 75.2097 | 551.5 |
| D-75MF-2Cr | III | 1.137 | 0.939 | 74.9680 | 74.9008 | 534.3 |
| D-75MF-5Cr | III | 1.137 | 0.939 | 74.9419 | 74.7339 | 514.3 |
| E-80MF-5Cr | III | 1.174 | 0.982 | 74.9474 | 74.8925 | 514.2 |
| E-90MF-5Cr | III | 1.174 | 0.982 | 75.2610 | 75.2097 | 537.8 |
| D-80MF-7.5Cr | III | 1.137 | 0.939 | 74.8236 | 74.7534 | 511.0 |

EXAMPLE 15

Comparison of Cr-doped Mn-rich Non-stoichiometric LFMP as a Function of Doping Conditions (Cr Doping Level and MF Ratio) and Composition The Examples 8-11 indicate that for the group of analysed samples, the non-stoichiometric LFMP that has the specific composition for which P=0.982 and LM=1.106, has the best electrochemical properties, and that these electrochemical properties can be improved by doping. In one embodiment, Cr is used as the doping elements to improve the electrochemical properties. Table 12 shows the unit cell volume and energy density of the non-stoichiometric LFMP samples as a function of the doping conditions (Cr doping level and MF ratio) and composition. The column Volume (calc) gives the unit cell volume calculated by the Formula 2 based on the doping information.

FIG. 11 shows a plot of samples in Table 12. "V" stands for the measured unit cell volume per LFMP formula (in Å$^3$), obtained from the Rietveld refinement. "V" stands for the unit cell volume obtained when applying Formula 2. It clearly shows five samples with composition "A-" fits quite

We claim:

1. An olivine cathode material having the formula $Li_aFe_{1-x-y-z}Mn_xD_{(y+z)}(PO_4)_c$, wherein a, c, x, y and z represent molar amounts, wherein D=Mg and/or Cr, wherein y represent the amount of Mg and z represents the amount of Cr, wherein 1.04<a<1.15; wherein 0.97<(2*c/(a+1))<1.07; wherein 0.6<x<1−y−z; wherein 0<y+z<0.1.

2. The olivine cathode material according to claim 1, wherein 0.04<y+z<0.08.

3. The olivine cathode material according to claim 2, wherein y+z>0.05.

4. The olivine cathode material according to claim 1, wherein z/y>1.

5. The olivine cathode material according to claim 4, wherein y=0.

6. The olivine cathode material according to claim 1, wherein 0.7<x<0.9.

7. The olivine cathode material according to claim 6, wherein z/y>1.

8. The olivine cathode material according to claim 7, wherein y=0.

9. The olivine cathode material according to claim 6, wherein 0.75<x<0.895.

10. The olivine cathode material according to claim 9, wherein z/y>1.

11. The olivine cathode material according to claim 10, wherein y=0.

12. The olivine cathode material according to claim 6, wherein $0.98<(2*c/(a+1))<1$.

13. The olivine cathode material according to claim 1, wherein $1.07<a<1.13$.

14. The olivine cathode material according to claim 13, wherein $0.98<(2*c/(a+1))<1$.

15. The olivine cathode material according to claim 1, wherein $0.98<(2*c/(a+1))<1$.

16. The olivine cathode material according to claim 1, wherein $1.07<a<1.13$ and wherein $0.7<x<0.9$.

17. The olivine cathode material according to claim 16, wherein z/y>1.

18. The olivine cathode material according to claim 17, wherein y=0.

19. The olivine cathode material according to claim 16, wherein $0.98<(2*c/(a+1))<1$.

20. The olivine cathode material according to claim 19, wherein $0.75<x<0.895$.

21. The olivine cathode material of claim 1, wherein at least 90% by weight of the material is a single phase olivine.

22. The olivine cathode material according to claim 21, wherein at least 98% by weight of the material is a single phase olivine.

23. The olivine cathode material of claim 1, wherein the unit cell volume in Å$^3$ for one formula unit of olivine lies between $72.633-3.8715y-5.562z+3.172x-0.05$ and $72.633-3.8715y-5.562z+3.172x+0.05$.

24. The olivine cathode material of claim 1, wherein the unit cell volume in Å$^3$ for one formula unit of olivine lies between $72.633-3.8715y-5.562z+3.172x-0.01$ and $72.633-3.8715y-5.562z+3.172x+0.01$.

25. The olivine cathode material of claim 1, having a BET surface area value >10 m$^2$/g.

26. The olivine cathode material of claim 1, having a phosphor stoichiometry (P) having a value $0.98 \leq P<1.028$, wherein P=amount of PO$_4$ divided by half the sum of the amount of lithium and metal.

* * * * *